United States Patent
Thirumurthi et al.

(10) Patent No.: US 12,206,709 B2
(45) Date of Patent: Jan. 21, 2025

(54) DYNAMIC MANAGEMENT OF SECURITY RULES AND POLICIES

(71) Applicant: Cisco Technology, Inc., San Jose, CA (US)

(72) Inventors: Rajendra Kumar Thirumurthi, Milpitas, CA (US); Praveen parthasarathy Iyengar, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 17/876,939

(22) Filed: Jul. 29, 2022

(65) Prior Publication Data
US 2024/0039957 A1 Feb. 1, 2024

(51) Int. Cl.
*H04L 9/40* (2022.01)
*H04L 47/2408* (2022.01)
*H04L 47/32* (2022.01)
*H04L 69/22* (2022.01)

(52) U.S. Cl.
CPC .......... *H04L 63/20* (2013.01); *H04L 47/2408* (2013.01); *H04L 47/32* (2013.01); *H04L 69/22* (2013.01)

(58) Field of Classification Search
CPC ..... H04L 63/20; H04L 47/2408; H04L 47/32; H04L 69/22
See application file for complete search history.

(56) References Cited

U.S. PATENT DOCUMENTS

| | | | |
|---|---|---|---|
| 2014/0380460 A1 | 12/2014 | Bhalerao et al. | |
| 2015/0003252 A1 | 1/2015 | Badhani et al. | |
| 2020/0314011 A1* | 10/2020 | Deval | H04L 45/74591 |
| 2020/0374231 A1* | 11/2020 | Cai | H04L 45/74591 |
| 2021/0226883 A1 | 7/2021 | Pawar et al. | |
| 2021/0258286 A1 | 8/2021 | Moore et al. | |

(Continued)

OTHER PUBLICATIONS

Juniper Networks, "Contrail Networking and Security User Guide," Dec. 1, 2020, downloaded from https://www.juniper.net/documentation/en_US/contrail19/topics/task/configuration/service-chaining-vnc.html, 186 pages.

(Continued)

*Primary Examiner* — Joe Chacko
(74) *Attorney, Agent, or Firm* — Lee & Hayes, P.C.

(57) ABSTRACT

A method of managing security rules may include extracting metadata from a data packet received at a first network device. The metadata including network metadata and network system metadata. The method may further include distributing the metadata to at least one service endpoint registered with the first network device, receiving from the at least one service endpoint, an indication as to how traffic associated with the data packet is to be handled, and enabling the traffic based at least in part on feedback received from the at least one service endpoint and creating a first service flow hash entry of a hash table associated with the data packet at the first network device. The first service flow hash entry identified each of a number of services using a unique number. The method may further include distributing the hash table including the first service flow hash entry across a fabric to at least a second network device.

20 Claims, 6 Drawing Sheets

(56) References Cited

U.S. PATENT DOCUMENTS

2021/0311772 A1   10/2021  Mishra et al.
2023/0269148 A1*  8/2023  Foo ........................ H04L 43/04
                                                                                 709/224

OTHER PUBLICATIONS

Cisco, "Layer 4 to Layer 7 Service Redirection with Enhanced Policy-Based Redirect," Jul. 1, 2021, downloaded from https://www.cisco.com/c/en/us/products/collateral/switches/nexus-9000-series-switches/layer4-layer7-service-redir-ply-based-redir-wp.html, 36 pages.
Cisco, "Service Graph Design with Cisco ACI (Updated to Cisco APIC Release 5.2) White Paper," Jul. 23, 2021, downloaded from https://www.cisco.com/c/en/us/solutions/collateral/data-center-virtualization/application-centric-infrastructure/white-paper-c11-2491213.html, 76 pages.

* cited by examiner

DYNAMIC MANAGEMENT OF SECURITY RULES AND POLICIES

TECHNICAL FIELD

The present disclosure relates generally to computer networking. Specifically, the present disclosure relates to systems and methods for dynamically inserting and/or removing security rules for network traffic.

BACKGROUND

Computing networking may include a number of computing devices acting as nodes within the network that use common communication protocols over telecommunication technologies to communicate with each other in a number of network topologies. A data-centric network may be programmed to serve varied use-cases of customer deployments even in instances where the network has a generic infrastructure. In some computing networks, service-chaining may be static in nature where manual user configuration may be utilized to make decisions regarding data packet routing. In a software-as-a-service (SaaS) and cloud functions, a flexible, scalable, and dynamic service-chaining solution may improve how data packets are routed throughout the network. Further, the service-chaining solution may be service endpoint aware and service agnostic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
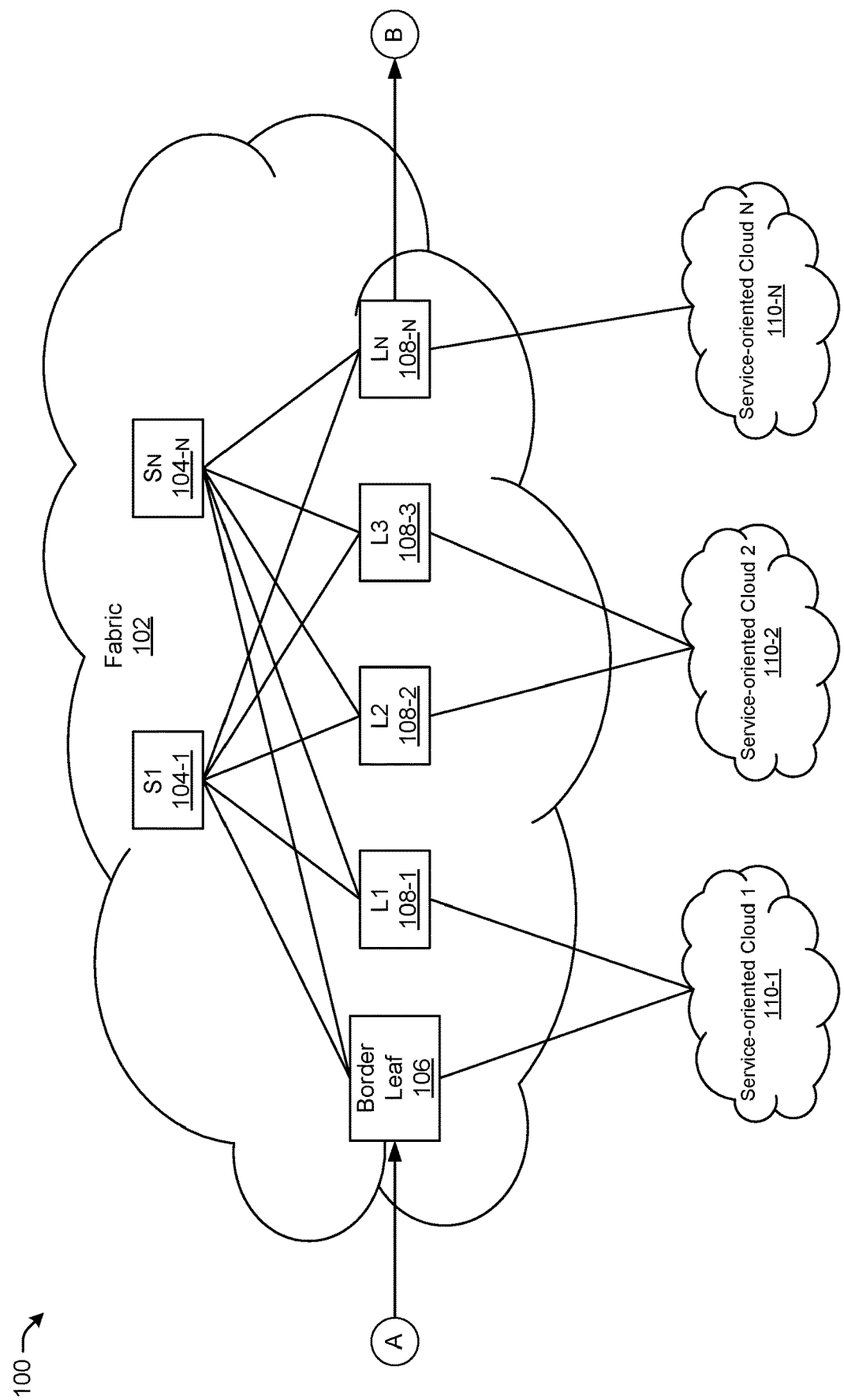
FIG. 1 illustrates a system-architecture diagram of a network that utilizes service chaining and service flow hash entries, according to an example of the principles described herein.

In some computing networks, network functions virtualization (NFV) may be used as a network architecture that leverages virtualization technologies to virtualize classes of network node functions into building blocks that may chain together to create and deliver communication services. NFV is a software drive model. In NFV, service chaining may be used in validating traffic to make sure the traffic correctly routes through the network. Various service chaining and redirection solutions may be static in nature as they include a number of predefined user configurations. However, these service chaining solutions cannot apply intelligence in choosing what data packets are to be inspected such that all the network traffic ends up in the NFV and service endpoints in a service chain which are low throughput devices. This may result in significant bottlenecks.

In a computing network that includes many entry points such as border or leaf nodes, bad actors may infiltrate the network and significantly impact traffic within the network. Thus, increased security within the network may become a significant goal. In one example, the enforcement of policies within a network may include the use of a controller used to enable policies to network devices within a fabric. However, the controller may only be able to react to security breaches resulting in security threat mitigation coming too late. In one example, a switch within the fabric may be used to enforce policies at other network devices within the fabric. However, in this example, the switch may be a low throughput device that may cause performance degradation.

Further, in some computing networks, it may be beneficial to inspect every data packet trafficked within the network. However, this may not be possible without impacting a traffic rate of a network device such as a switch. One component of a layer 2 (L2) or layer 3 (L3) switch is a ternary content addressable memory (TCAM). TCAM is an expensive component and may be a scarce resource on many switching platforms, and especially so on lower-end platforms where an administrator must make a decision on how to carve up the available TCAM resources so that it fits with the role the switch plays in the network. Because regions of the TCAM may be limited an administrator may need to be conservative and selective when programming policies.

Services provided within a computer network may be added to an overlay network to obtain the benefit of flexible scaling (e.g., scaling up and scaling down) of services. The network connectivity of the service may be dynamic in nature. Thus, there may be a need to automatically manage the policies on a switch within a fabric. Further, the services may also be dynamic and programmable. Thus, there is a need for a more flexible framework for service redirection.

Overview

In the examples described herein, a network system including a number of nodes within a fabric and a number of service-enabled cloud networks coupled to the fabric may utilize a decentralized service-chaining and a number of optimized global hash table entries to enforce a flexible, customizable, and hardware optimized service chaining network. The service chaining accommodates for legacy devices that are unable to understand network service headers (NSHs). Further, the systems and methods described herein are agnostic to different types of traffic profiles and can handle service that span across different clouds.

Examples described herein provide a method of managing security rules. The method may include extracting metadata from a data packet received at a first network device. The metadata including network metadata and network system metadata. The method may further include distributing the metadata to at least one service endpoint registered with the first network device, and receiving from the at least one service endpoint, an indication as to how traffic associated with the data packet is to be handled. The method may further include enabling the traffic based at least in part on feedback received from the at least one service endpoint and creating a first service flow hash entry (ServiceFlowHashEntry) of a hash table associated with the data packet at the first network device. The first service flow hash entry identifying each of a number of services using a unique number. The method may further include distributing the hash table including the first service flow hash entry across a fabric to at least a second network device.

The method may further include creating a second service flow hash entry of the hash table associated with the data packet at the second network device to create an updated hash table and distributing the updated hash table across the fabric to at least one of the first network device or a third network device. The at least one service endpoint is registered with the at least one of the first network device and the second network device. The feedback from the service endpoint includes at least one action including an ignore action, a service chain action, a drop action, or a copy action. Distributing the metadata to the at least one service endpoint registered with the first network device may include distributing the metadata to at least one of the number of services that are part of a bitmap of the hash table, and receiving data defining the at least one action.

The method may further include determining which of the ignore action, the service chain action, the drop action, and the copy action is returned as the feedback. In response to a determination that the feedback includes the drop action, the method may further include dropping the data packet, and propagating instructions to at least one of the second network device or a third network device to drop additional data packets of a same type as the data packet. In response to a determination that the feedback includes the ignore action, the method may further include ignoring the data packet, dropping the data packet when the data packet is closed, and propagating instructions to at least one of the second network device or the third network device to drop additional data packets of the same type as the data packet. In response to a determination that the feedback includes the service chain action, method may further include service chaining a first service of the number of services to a second service of the number of services, forwarding the data packet from the first network device to the second network device, and at the second network device, comparing the first service flow hash entry of the first network device as defined in the hash table with a second service flow hash entry of the second network device as defined in the hash table. In response to a determination that a bit of the second service flow hash entry is not set in the first service flow hash entry, the method may further include restricting the forwarding of the data packet to the first service. In response to a determination that the bit of the second service flow hash entry is set in the first service flow hash entry, the method may further include restricting the forwarding of the data packet to the first service. In response to a determination that the feedback includes the copy action, the method may further include copying the data packet, forwarding the data packet to the first service, and propagating instructions to at least one of the second network device or the third network device to copy additional data packets of the same type as the data packet.

Distributing the hash table may include distributing the hash table using a gossip protocol. At least one of the first service flow hash entry and a second service flow hash entry of the hash table may be maintained at runtime at at least one of the first network device and the second network device.

Examples described herein also provide a system including a processor, and a non-transitory computer-readable media storing instructions that, when executed by the processor, causes the processor to perform operations including extracting metadata from a data packet received at a first network device, the metadata including network metadata and network system metadata, distributing the metadata to at least one service endpoint registered with the first network device, receiving from the at least one service endpoint, an indication as to how traffic associated with the data packet is to be handled, enabling the traffic based at least in part on feedback received from the at least one service endpoint, and creating a first service flow hash entry (ServiceFlowHashEntry) of a hash table associated with the data packet at the first network device. The first service flow hash entry may identify each of a number of services using a unique number. The operations may further include distributing the hash table including the first service flow hash entry across a fabric to at least a second network device.

The operations may further include creating a second service flow hash entry of the hash table associated with the data packet at the second network device to create an updated hash table and distributing the updated hash table across the fabric to at least one of the first network device or a third network device.

The feedback from the service endpoint includes at least one action including an ignore action, a service chain action, a drop action, or a copy action. Distributing the hash table may include distributing the hash table using a gossip protocol. At least one of the first service flow hash entry and a second service flow hash entry of the hash table may be maintained at runtime at at least one of the first network device and the second network device. The first network device may be a border leaf network device and the second network device is a non-border leaf network device. At least one of the number of services may be provided by a cloud network coupled to the fabric.

Examples described herein also provide a non-transitory computer-readable medium storing instructions that, when executed, causes a processor to perform operations, including extracting metadata from a data packet received at a first network device. The metadata including network metadata and network system metadata. The operations may further include distributing the metadata to at least one service endpoint registered with the first network device, receiving from the at least one service endpoint, an indication as to how traffic associated with the data packet is to be handled, enabling the traffic based at least in part on feedback received from the at least one service endpoint, creating a first service flow hash entry (ServiceFlowHashEntry) of a hash table associated with the data packet at the first network device, the first service flow hash entry identifying each of a number of services using a unique number, and distributing the hash table including the first service flow hash entry across a fabric to at least a second network device.

The operations may further include creating a second service flow hash entry of the hash table associated with the data packet at the second network device to create an updated hash table and distributing the updated hash table across the fabric to at least one of the first network device or a third network device. The feedback from the service endpoint includes at least one action including an ignore action, a service chain action, a drop action, or a copy action. Distributing the hash table includes distributing the hash table using a gossip protocol. At least one of the first service flow hash entry and the second service flow hash entry of the hash table is maintained at runtime at at least one of the first network device and the second network device.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 illustrates a system-architecture diagram of a network 100 that utilizes service chaining and service flow hash entries, according to an example of the principles described herein. The network 100 may include a fabric 102. The fabric may include any mesh of connections between network devices such as access points, switches, and routers that transports data to its destination. The fabric 102 may include physical hardware (e.g., wirings that make up the connections between the network devices) and/or a virtualized, automated lattice of overlay connections on top of the physical topology.

In one example, the fabric 102 may include a spine-and-leaf architecture and topology. The spine-and-leaf architecture of the fabric 102 may include number of spine nodes 104-1, ... 104-N, where N is any integer greater than or equal to 1 (collectively referred to herein as spine node(s) 104 unless specifically addressed otherwise). Further, the spine-and-leaf architecture of the fabric 102 may include at least one border leaf node 106. A border leaf node 106 may include any network device used to connect external networks to the fabric 102. The spine-and-leaf architecture of the fabric 102 may also include a number of leaf nodes 108-1, 108-2, 108-3, 108-N, where N is any integer greater than or equal to 1 (collectively referred to herein as leaf node(s) 108 unless specifically addressed otherwise). The spine nodes 104, border leaf node(s) 106, and the leaf nodes 108 may include any fabric device such as, for example, access points, switches, routers, and other types of network devices.

As depicted in FIG. 1, the network 100 may include, in one example, a two-tier Clos architecture where the multi-stage circuit-switching network represents a theoretical idealization of practical, multistage switching systems. In this example, every lower-tier switch (e.g., a leaf layer) including, for example, the border leaf node 106 and/or the leaf nodes 108 are connected to each of the top-tier switches (e.g., a spine layer) including, for example, the spine nodes 104 in a full-mesh topology. The leaf layer may include access switches that connect to devices such as servers (e.g., the service-oriented cloud networks 110). The spine layer may serve as the backbone of the network 100 and may be responsible for interconnecting all leaf switches (e.g., the border leaf node 106 and/or the leaf nodes 108). Every border leaf node 106 and leaf node 108 may connect to every spine node 104 in the fabric 102.

A number of service-oriented cloud networks 110-1, 110-2, ... 110-N, where N is any integer greater than or equal to 1 (collectively referred to herein as leaf node(s) 104 unless specifically addressed otherwise). The service-oriented cloud networks 110 may include a public cloud, private cloud, a multicloud, hybrid cloud or other types of cloud networks that may provide any form of layer 4 (L4) through layer 7 (L7) (L4-L7) network service. L4-L7 network services define a set of functions within the Open Systems Interconnection (OSI) model. The types of functions or services provided by the service-oriented cloud networks 110 may include, for example, firewall services, load-balancer services, TCP optimizer services, web cache services, a domain name system (DNS) caching service, an intrusion detection system (IDS) service, an intrusion prevention system (IPS) service, service discovery services, virtual private network (VPN) services, application delivery services, intrusion prevention services, intrusion detection services, network layer monitoring services, any as-a-Service (aaS) services, other types of services, and combinations thereof. The as-a-service services may include, for example, SaaS, platform-as-a-service (PaaS), infrastructure-as-a-service (IaaS), security-as-a-service (SCaaS), and other forms of services.

Traffic moving through the fabric 102 may move east-west from A to B (A→B) as depicted in FIG. 1. East-west traffic may include network traffic among devices within a data center such as the network 100. The other direction of traffic flow may include north-south traffic where data flows from or to a system physically residing outside the data center such as data flowing from the fabric 102 to one or more of the service-oriented cloud networks 110. In the examples described herein, traffic may flow into the network 100 at A with a border leaf node 106 being the access point. Further, traffic leaving the network 100 may flow from one of the leaf nodes 108 to B.

Having described the various elements of the network 100, the manner in which the system operates will now be described. Each of the spine nodes 104, border leaf node(s) 106, and leaf nodes 108 that receives a data flow for the first time may out metadata obtained from the data flow to all the service endpoints that are registered with the nodes 104, 106, 108. A service endpoint may include any of the network devices (e.g., the spine nodes 104, the border leaf node(s) 106, and the leaf nodes 108, etc.) in the fabric 102 that utilize the service-oriented cloud networks 110 and their associated devices and services. In one example, the network 100 may run a registration system for a number of services as the services are onboarding. The network 100 may glean each new traffic flow into the network 100 and obtain the metadata from data packet(s) within the traffic flow.

The metadata may include two types of metadata including network metadata and network system metadata. The network metadata may include any information regarding the traffic flow in order to know what type of data packet(s) are included in the traffic flow. For example, the network metadata may include a packet header of the data packet(s) within the traffic flow, an incoming port where the traffic flow originated. This network metadata may be used to classify what type of traffic flow is incoming and where the traffic flow is received from. Other network metadata than those described herein may also be gleaned from the data packets within the traffic flow.

The network system metadata may include any information defining an architecture and/or topology of the network 100 including the fabric 102, roles of network devices within the network 100 or fabric 102, and other characteristics of the network 100 and the fabric 102. For example, the network system metadata may include information defining a role of the network devices within the fabric 102 and from where the traffic flow is coming among the network devices. This metadata may include data defining the spine nodes 104, the border leaf node(s) 106, and the leaf nodes 108, their roles within the fabric 102, how they are arranged within the fabric 102, whether the traffic flow is coming from a spine layer, a leaf layer, an edge layer, or other generalized portion of the fabric 102, and other information defining the network devices (e.g., the spine nodes 104, the border leaf node(s) 106, and the leaf nodes 108, etc.). Knowing the role of the network devices in the fabric 102 may affect the actions the services may take in addressing the traffic flow.

Another type of network system metadata may include data defining a version of the software used to transmit the data packets. Further, another type of network system metadata may include data defining a version of third party packages. Allowing the software version and the version of the third party packages allows the services provided by the service-oriented cloud network(s) 110 to identify and/or track any known vulnerabilities that might impact the traffic flow.

Yet another type of network system metadata may include data defining a device identification (ID) such as, for example, a global device ID used by the services to identify the network devices (e.g., the spine nodes 104, the border leaf node(s) 106, and the leaf nodes 108, etc.). Further, another type of network system metadata may include data defining how many open ports are available. Another type of network system metadata may include data defining a number of concurrent connections between the network devices (e.g., the spine nodes 104, the border leaf node(s) 106, and the leaf nodes 108, etc.) and service-oriented cloud networks 110. Other network system metadata than those described herein may also be gleaned from the data packets within the traffic flow.

With the network metadata and network system metadata, a given network device (e.g., the spine nodes 104, the border leaf node(s) 106, and the leaf nodes 108, etc.) that receives a traffic flow may create a service flow hash entry (e.g., ServiceFlowHashEntry) as an entry in a hash table. Each network device (e.g., the spine nodes 104, the border leaf node(s) 106, and the leaf nodes 108, etc.) within the fabric 102 may do this when traffic flow is received. In one example, the hash table may include a 64 bit hash and a 64 bitmap. The service flow hash entries included in the hash table represent a normalized manner of representing the traffic flow and may be customized based on user needs.

Each service in the fabric 102 may be assigned a unique bit number depending on the role of the service. In one example, the assignment of the unique bit number may be better understood using the example in Table 1 as follows:

TABLE 1

Example of reserved bits for services

| Service Type | Bit Number |
|---|---|
| Firewall | 1 |
| Load-balancer | 2 |
| TCP Optimizer | 3 |
| . . . | . . . |
| . . . | . . . |
| . . . | . . . |
| . . . | 64 |

The assignment of bit numbers to the service type depicted in Table 1 is only an example. Any type of service may be assigned any bit number. However, once assigned, the service type is identified based on the bit number.

In the example of Table 1, a firewall is assigned bit number 1, a load balancer is assigned bit number 2, a TCP optimizer is assigned bit number 3, and so on. Any number of service types may be included in Table 1 up to and including 64 services. The hash table entries be better understood using the example in Table 1 as follows:

TABLE 2

Example service flow hash entries of the hash table

| Flow ID | Switch ID | ServiceHashEntry Key | ServiceHashEntry Value |
|---|---|---|---|
| A→B | Border Leaf Node | HASHAB | 110000000000 |
| | Leaf Node 1 | HASHAB | 100000000000 |
| | Leaf Node 2 | HASHAB | 100000000000 |
| | Leaf Node 3 | HASHAB | 010000000000 |
| | Leaf Node 4 | HASHAB | 000000000000 |

The above hash table includes a flow ID and is designated in this example as A→B and is depicted in the example of FIG. 1. The network 100 may service chain across a maximum of 64 services given the 64 potential entries as reserved bits in Table 1. Further, the service flow hash entries depicted in the example of Table 2 may be maintained at runtime one each of the network device (e.g., the spine nodes 104, the border leaf node(s) 106, and the leaf nodes 108, etc.) within the fabric 102 for each unique traffic flow.

In one example, the service flow hash entries may be optimized to group the service flow hash entries if they share the same service chain. In one example, multiple host specific A→B entries in the hash table of Table 2 may be replaced with a subnet entry as long as the A→B entries share the same service chain.

The hash tables created by each of the individual network devices (e.g., the spine nodes 104, the border leaf node(s) 106, and the leaf nodes 108, etc.) within the fabric 102 may be shared with all of the network devices (e.g., the spine nodes 104, the border leaf node(s) 106, and the leaf nodes 108, etc.). In one example, any gossip protocol may be used by a network device (e.g., the spine nodes 104, the border leaf node(s) 106, and the leaf nodes 108, etc.) to share the hash table. A gossip protocol may include any procedure or process of computer peer-to-peer (P2P) communication in which each network device (e.g., the spine nodes 104, the border leaf node(s) 106, and the leaf nodes 108, etc.) shares the hash table it created with its neighbors.

A service flow hash entry may create a unique 64 bit number and will create a bitmap defining which of the services the traffic flow will go through. In this manner, the network 100 is aware of which types of services the traffic flow will utilize.

The workflow of the interaction of the traffic flow with the services may include, at a first network device (e.g., the spine nodes 104, the border leaf node(s) 106, and the leaf nodes 108, etc.) within the fabric 102 that receives an A→B traffic flow in a first instance, extracting metadata from a data packet of the traffic flow received. The metadata includes the network metadata and the network system metadata. The first network device (e.g., the spine nodes 104, the border leaf node(s) 106, and the leaf nodes 108, etc.) may distribute the metadata it gleaned to at least one service endpoint registered with the first network device including all other network devices (e.g., the spine nodes 104, the border leaf node(s) 106, and the leaf nodes 108, etc.) within the fabric 102.

Further, the first network device (e.g., the spine nodes 104, the border leaf node(s) 106, and the leaf nodes 108, etc.) may send the metadata to all the services that are part of the bitmap created by the first network device (e.g., the spine nodes 104, the border leaf node(s) 106, and the leaf nodes 108, etc.) so that the network 100 may know which of the virtual services require the metadata. The services are any of the services provided by the service-oriented cloud networks 110.

The first network device (e.g., the spine nodes 104, the border leaf node(s) 106, and the leaf nodes 108, etc.) may receive from at least one service endpoint, an indication as to how traffic flows associated with the data packet are to be handled by the network devices (e.g., the spine nodes 104, the border leaf node(s) 106, and the leaf nodes 108, etc.). In the response from the service endpoint(s), the services may designate one of four actions defining how traffic flows associated with the data packet are to be handled. These four actions include ignore, service chain, drop, and copy. In this manner, depending on what type of service(s) are responding, the information provided in the response from the service endpoints will define how the services are requesting the network devices (e.g., the spine nodes 104, the border leaf node(s) 106, and the leaf nodes 108, etc.) to handle the traffic flows.

Accordingly, the network devices (e.g., the spine nodes 104, the border leaf node(s) 106, and the leaf nodes 108, etc.) will take one of the four actions (e.g., ignore, service chain, drop, and copy) upon receipt of the traffic flow. In this manner, the actions are off-loaded to the services and the service-oriented cloud networks 110. This may allow for any policies changed at the service to be pushed to the network devices (e.g., the spine nodes 104, the border leaf node(s) 106, and the leaf nodes 108, etc.) within the fabric 102 acting as the service endpoints.

Once the response is received from the service endpoints regarding the actions, the first network device (e.g., the spine nodes 104, the border leaf node(s) 106, and the leaf nodes 108, etc.) may enable the traffic flow based on the action indicated in the feedback from the various service endpoints.

In every instance in which a hash table update takes place in a network device such as the first network device (e.g., the spine nodes 104, the border leaf node(s) 106, and the leaf nodes 108, etc.), the updated hash table may be propagated to every other network device within the fabric 102 using the gossip protocol described herein. Those other network devices may also create a service flow hash entry with bits for that entry set for the appropriate services in the bitmap. In this manner, all the network devices (e.g., the spine nodes 104, the border leaf node(s) 106, and the leaf nodes 108, etc.) within the fabric 102 may continually update their own hash table, propagate that updated hash table to the other network devices for updating their respective hash tables resulting in all the network devices (e.g., the spine nodes 104, the border leaf node(s) 106, and the leaf nodes 108, etc.) continually updating their respective hash tables and having the same hash table as the other network devices. Thus, once the hash table is updated, it may be circulated across the network devices (e.g., the spine nodes 104, the border leaf node(s) 106, and the leaf nodes 108, etc.) within the fabric.

Example of a Service Chain Action

Table 1 and Table 2 above may be used to describe possible use cases and corresponding outcomes of the processed described above. In one example, the traffic flow A→B may arrive at the border leaf node 106. The first service-oriented cloud network 110-1 may respond with the action "service chain" as related to firewall (e.g., bit 1) and load balancer (bit 2) based on the information depicted in the reserved bits for services of Table 1 above. This situation is depicted in the first row of the service flow hash entries of the hash table of Table 2 where the border leaf node 106 identified by a switch ID (e.g., a network device ID) is identified as being within the traffic flow A→B and has a service hash entry key of "HASHAB" since the packet header of the data packet of traffic flow A→B will hash to this designation in this example. The service hash entry value for this first entry for the border leaf node 106 may be "110000000000" designating the firewall (e.g., bit 1) and load balancer (bit 2) using the 1's at the first two digits and not designating the TCP optimizer using the first 0 at bit 3. In this example, when traffic flow A→B arrives at the border leaf node 106, the border leaf node 106 will service chain the firewall service and the load balancer service and forward the traffic flow to a next leaf node such as leaf node 108-1.

Thus, when the traffic flow A→B arrives at the border leaf node 106, the first service-oriented cloud network 110-1 may respond with an action to service chain the firewall (bit 1) and the load balancer (bit 2). When the traffic flow A→B arrives at the first leaf node 108-1 and/or the second leaf node 108-2, the second service-oriented cloud network 110-2 may respond with an action to service chain the firewall (bit 1). When the traffic flow A→B arrives at the third leaf node 108-3, the second service-oriented cloud network 110-2 may respond with an action to service chain the load balancer (bit 2). Further, when the traffic flow A→B arrives at the fourth leaf node 108-4, the third service-oriented cloud network 110-N may respond with no service chain since the service flow hash entry for the fourth leaf node 108-4 does not designate a service.

In one example, the first leaf node 108-1 may compare the bits of the first service flow hash entry (e.g., the first row) of the hash table related to the border leaf node 106 with the second service flow hash entry (e.g., the second row) of the hash table related to leaf node 108-1 and will not forward the service(s) if the bits are not set in the previous leaf node (e.g., the border leaf node 106 in this example). Similarly, leaf nodes 108-2, 108-3, 108-N will make the same comparison with their respective previous leaf node. Since border leaf node 106 has service chained to all services, leaf nodes 108-1, 108-2, 108-3, 108-N will simply forward the traffic flow.

Example of a Service Chain Action with an Updated Service Flow Hash Entry

In one example, the border leaf node 106 may not be able to send the traffic flow to any of the services listed in Table 1. In this example, the border leaf node 106 may update the service flow hash entry of the hash table (e.g., Table 2) with the new value of "000000000000" designating none of the services instead of what is indicated in the first service flow hash entry (e.g., the first row) of the hash table. Further, the first service-oriented cloud network 110-1 may respond to the first leaf node 108-1 with the action "service chain" as related to firewall (e.g., bit 1) and as similarly done on the above example. The border leaf node 106 may then propagate this updated service flow hash entry of the hash table across the fabric 102 to at least all the leaf nodes 108-1, 108-2, 108-3, 108-N. In this scenario, the first leaf node 108-1 will service chain to firewall since the second service flow hash entry (e.g., the second row) of the hash table related to leaf node 108-1 designates the firewall (e.g., bit 1) using 1 at the first digit and not designating the load balancer and TCP optimizer using the 0 at bits 2 and 3. Similarly, the second leaf node 108-2 will service chain to the firewall since the third service flow hash entry (e.g., the third row) of the hash table related to leaf node 108-2 designates the firewall (e.g., bit 1) using 1 at the first digit and not designating the load balancer and TCP optimizer using the 0 at bits 2 and 3. The third leaf node 108-3 will service chain to the load balancer since the fourth service flow hash entry (e.g., the fourth row) of the hash table related to leaf node 108-3 designates the load balancer (e.g., bit 2) using 1 at the second digit and not designating the firewall and TCP optimizer using the 0 at bits 1 and 3. As to the fourth leaf node 108-N will not service chain any of the services since the sixth service flow hash entry (e.g., the sixth row) of the hash table related to the fourth leaf node 108-N designates none of the services using 0 at all the digits and not designating the firewall, the load balancer, or TCP optimizer using the 0 at bits 1, 2, and 3. Thus, in this example, the border leaf node 106 and the fourth leaf node 108-N will forward the traffic without service chaining any services.

Example of a Drop Action

An example of service chaining as an action is described above. In one example, the action "drop" may be the action the service endpoints define as the action the services are requesting the network devices (e.g., the spine nodes 104, the border leaf node(s) 106, and the leaf nodes 108, etc.) apply to handle the traffic flow A→B. The border leaf node 106 and the first leaf node 108-1 may receive the drop action instructions from the first service-oriented cloud network 110-1, the second leaf node 108-2 and the third leaf node 108-3 may receive the drop action instructions from the second service-oriented cloud network 110-2, and the fourth leaf node 108-N may receive the drop action instructions from the third service-oriented cloud network 110-3. In this example, and using the example hash table of Tables 1 and 2 above, traffic flow A→B may first be received at the border leaf node 106. In this example, the border leaf node 106 is going to the firewall (bit 1) and the load balancer (bit 2); the first leaf node 108-1 is going to the firewall (bit 1); the second leaf node 108-2 is going to the firewall (bit 1); the third leaf node 108-3 is going to the load balancer (bit 2); and the fourth leaf node 108-N is not going to any service. In the case of the second leaf node 108-2 and the firewall service, because the action is "drop" for the type of traffic flow that is traffic flow A→B, the second leaf node 108-2 will drop the traffic flow as instructed by the service. Further, second leaf node 108-2 will propagate changes to the service flow hash entry related to the traffic flow A→B to all the network devices (e.g., the spine nodes 104, the border leaf node(s) 106, and the leaf nodes 108, etc.) in the fabric 102 so that these network devices may obtain the updated service flow hash entry of the hash table and apply this action to the traffic flow A→B.

However, it may be more secure and computationally efficient to propagate to the remaining leaf nodes including the border leaf node 106 the information regarding the second leaf node 108-2 dropping this type of traffic flow as indicated above. All the leaf nodes (e.g., the border leaf node 106 and/or the leaf nodes 108) know that the traffic flow originates at the border leaf node 106 due to the consistent propagation of updated service flow hash entries throughout the fabric 102 and the indication of the traffic flow A→B identified in the hash table. Thus, because the second leaf node 108-2 has propagated an updated service flow hash entry to the rest of the network devices (e.g., the spine nodes 104, the border leaf node(s) 106, and the leaf nodes 108, etc.) in the fabric 102, the border leaf node 106 will know of the need to drop traffic flow A→B as soon as the border leaf node 106 receives the traffic flow A→B. Having the border leaf node 106 address the dropping of traffic flow A→B in place of the second leaf node 108-2 may be the most secure and computationally efficient method of realizing the drop action. This is because traffic flow A→B would not penetrate further into the fabric 102, and thus, would lower any security risks associated with the traffic flow A→B as well as reduce processing cycles on the remaining network devices (e.g., the spine nodes 104 and the leaf nodes 108, etc.).

As the network devices (e.g., the spine nodes 104, the border leaf node 106, and the leaf nodes 108, etc.) propagate their updated service flow hash entries of their respective hash tables throughout the fabric 102, there may exist some discrepancies in the hash tables of the network devices. As the size of the fabric 102 increases to include more spine nodes 104, border nodes 106, leaf nodes 108, and other network devices, a centralized controller would tend to slow down he policy modifications. However, the present systems and methods do not utilize a centralized controller but, instead, utilize the decentralized system described herein. In one example, the present systems and methods may utilize a P2P network architecture. Further, since the services described herein are cloud-first services where initial consideration of cloud solutions are considered more effective when developing new processes or adapting old processes before considering non-cloud-based solutions. The ability of the present systems and methods to respond to changes in an almost instantaneous manner and to be able to enforce policy modifications as dictated by the service-oriented cloud networks 110 provides for a more flexible, scalable, and effective network system.

With regard to scalability of the present systems and method, the selection of service flow hash entries to be considered for hash computation may be programmable and/or user definable. In this manner, the granularity of the rules may be defined as needed for an intended purpose within the fabric 102. For example, if a user seeks to summarize a relatively large amount of traffic within the fabric 102, the granularity of the rules enforcement may occur at a network 100 or fabric 102 level. If, however, if a user seeks to enforce policies or rules at a finer granularity, the rules enforcement may occur at the network devices (e.g., the spine nodes 104, the border leaf node 106, and the leaf nodes 108, etc.). Further, memory usage may be predictable and planned for since the size of each service flow hash entry within the hash table is fixed.

In one example, a number entries may be removed from the hash tables of the network devices (e.g., the spine nodes 104, the border leaf node 106, and the leaf nodes 108, etc.) in order to optimize resource usage including hardware usage of the network devices within the fabric 102. In some situations, the number of hardware entries may be limited. The present systems and methods provide for a paging functionality wherein a number of less used entries may be purged. The dropping of the traffic at the entry point in the fabric 102 (e.g., the border leaf node 106) may save entries on all the network devices (e.g., the spine nodes 104, the border leaf node 106, and the leaf nodes 108, etc.) within the fabric 102. Therefore, usage across the fabric 102 may be optimized. Since consistency within the fabric 102 is a goal, a number of entries may be continually purged based at least in part on their age (e.g., when the entries were first entered listed from most recently entered entry to most distantly entered entry).

Based on the above descriptions, the service flow hash entry (e.g., ServiceFlowHashEntry) of the hash table may be used as a normalized way of representing a traffic flow. The hash table and the service flow hash entries provide for the service-oriented cloud networks 110 to push changes to the rules or policies set by the service-oriented cloud networks 110 to the fabric 102 and the network devices (e.g., the spine nodes 104, the border leaf node 106, and the leaf nodes 108, etc.) rather than a reactive and less effective controller within the fabric 102.

Further, the present systems and methods allow for the selection of service chaining on each individual leaf. For example, using the hash table depicted in Tables 1 and 2 and the depiction of the service-oriented cloud networks 110 in FIG. 1, the firewall, load balancer, and TCP optimizer are available on all three service-oriented cloud networks 110-1, 110-2, 110-3. If, for example, the boarder leaf node 106, has access to the firewall and load balancer services, and the firewall service is not available for the border leaf node 106, the first leaf node 108-1 may send the traffic flow to the firewall in place of the border leaf node 106, and the border leaf node 106 may send the traffic flow to the load balancer. In this manner, the service chaining may be enforced at which ever of the network devices (e.g., the spine nodes 104, the border leaf node 106, and the leaf nodes 108, etc.) the services are available and intermediate network devices may appropriately forward the traffic flow.

Further, the present systems and methods provide for the ability to optimize the service flow hash entry (e.g., ServiceFlowHashEntry) of the hash table in the network devices (e.g., the spine nodes 104, the border leaf node 106, and the leaf nodes 108, etc.) by dropping the traffic flow at the ingress of the fabric 102 (e.g., at the border leaf node 106). This may assist in saving entries in the network devices while also saving on bandwidth of the service devices.

Still further, the present systems and methods provide for the sharing of system location specific metadata. This enables the services of the service-oriented cloud networks 110 to enforce location specific security profiles and data inspection. In this manner, the traffic flows may be inspected based on where the traffic flow is coming from. For example, a traffic flow that is coming into the fabric 102 at the border leaf node 106 may be subjected to a deep-packet inspection. However, if the traffic flow is coming into the fabric 102 at an intermediate leaf such as one of the leaf nodes 108, the traffic flow may be subjected to a regular packet inspection (e.g., a packet header inspection) since the traffic flow has already been scanned at least one time previously.

The present systems and methods are service-endpoint aware such that the destination (e.g., an endpoint among the network devices (e.g., the spine nodes 104, the border leaf node 106, and the leaf nodes 108, etc.)) of the data packets of traffic flow are known. Further, the present systems and methods are service-agnostic such that any number of a type of service such as different types of firewalls are all identified as being of the same type of service (e.g., a firewall in general).

Figure 2:
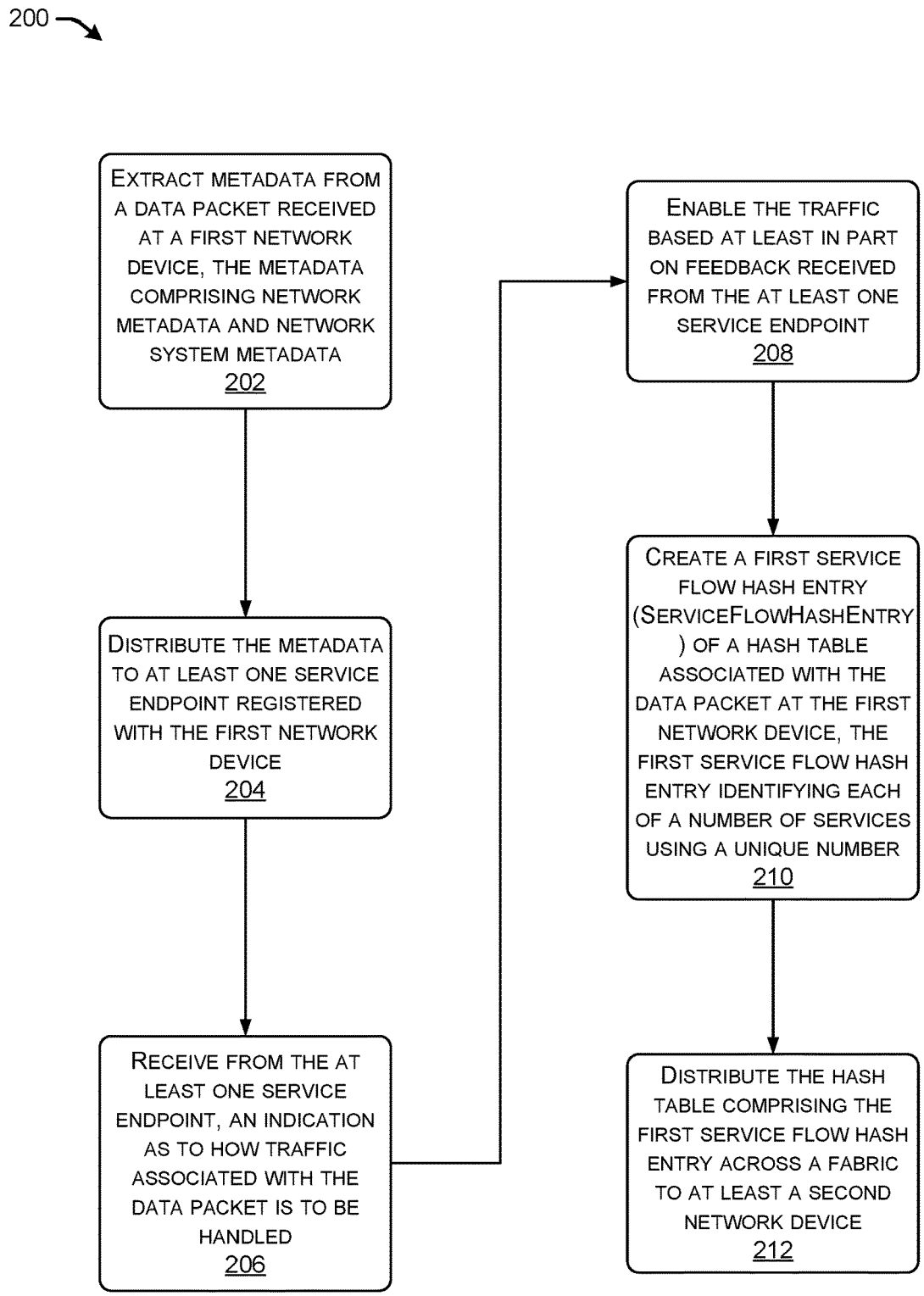
FIG. 2 illustrates a flow diagram of an example method for managing security rules, according to an example of the principles described herein.

FIG. 2 illustrates a flow diagram of an example method 200 for managing security rules, according to an example of the principles described herein. At 202, the method 200 may include extracting metadata from a data packet received at a first network device (e.g., any of the network devices (e.g., the spine nodes 104, the border leaf node(s) 106, and the leaf nodes 108, etc.) in the fabric 102). The metadata may include network metadata and network system metadata as described herein. The method 200 may further include distributing the metadata to at least one service endpoint registered with the first network device. Here, a service endpoint may include any of the network devices (e.g., the spine nodes 104, the border leaf node(s) 106, and the leaf nodes 108, etc.) in the fabric 102.

At 206 of FIG. 2, the method 200 may further include receiving from the at least one service endpoint, an indication as to how traffic associated with the data packet is to be handled. The indication as to how traffic associated with the data packet may include, for example, four actions may including ignore, service chain, drop, and copy.

The traffic may be enabled at 208 based at least in part on feedback received from the at least one service endpoint. At 210, the method 200 may further include creating a first service flow hash entry (ServiceFlowHashEntry) of a hash table associated with the data packet at the first network device. The first service flow hash entry identifies each of a number of services using a unique number. At 212, the hash table including the first service flow hash entry may be distributed across the fabric 102 to at least a second network device.

Figure 3:
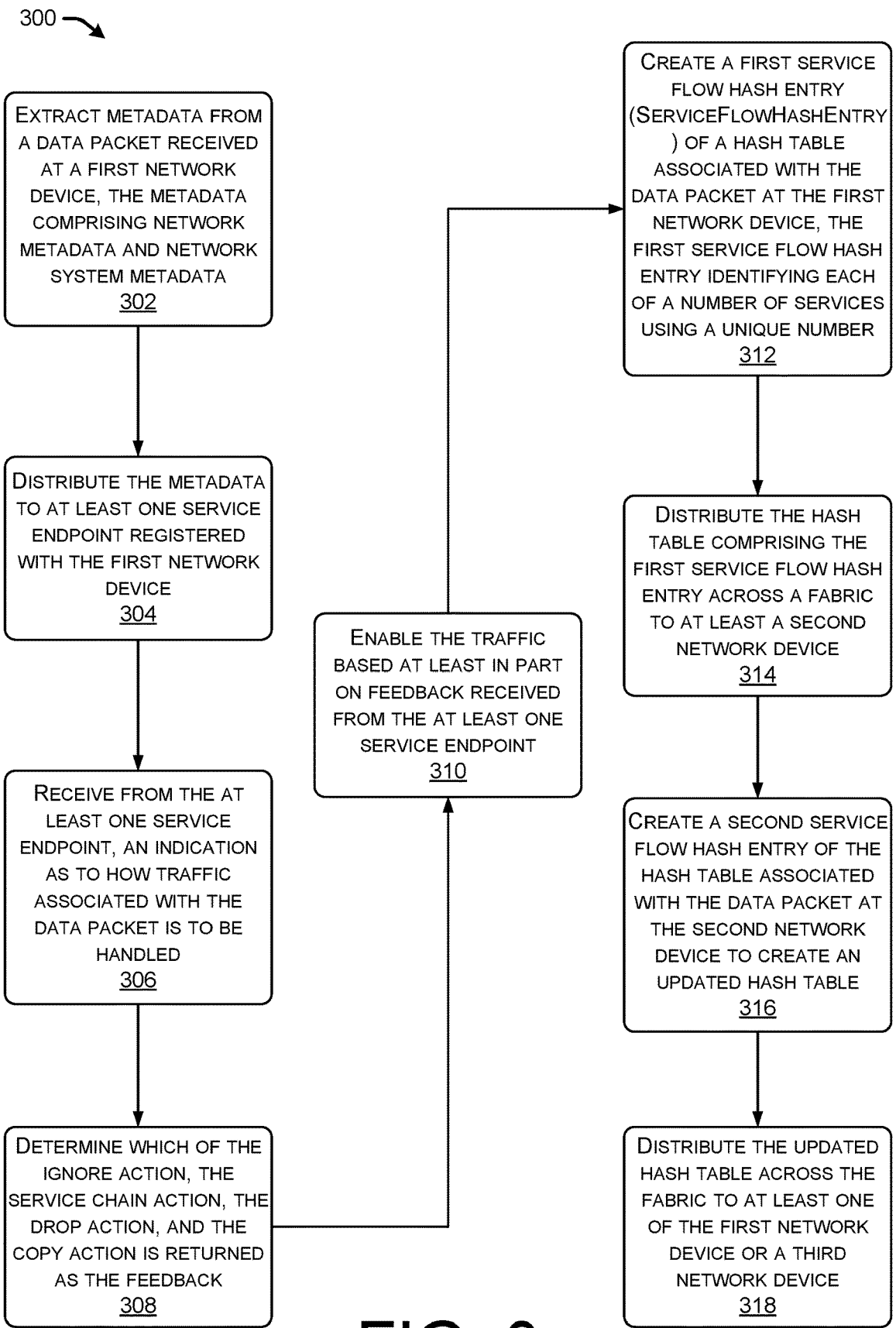
FIG. 3 illustrates a flow diagram of an example method for managing security rules, according to an example of the principles described herein.

FIG. 3 illustrates a flow diagram of an example method 300 for managing security rules, according to an example of the principles described herein. At 302, the method 300 may include extracting metadata from a data packet received at a first network device (e.g., any of the network devices (e.g., the spine nodes 104, the border leaf node(s) 106, and the leaf nodes 108, etc.) in the fabric 102). The metadata may include network metadata and network system metadata as described herein. The method 300 may further include distributing, at 304, the metadata to at least one service endpoint registered with the first network device. Here, a service endpoint may include any of the network devices (e.g., the spine nodes 104, the border leaf node(s) 106, and the leaf nodes 108, etc.) in the fabric 102. The at least one service endpoint may be registered with the at least one of the first network device and the second network device. Further, distributing the metadata to the at least one service endpoint registered with the first network device at 304 may include distributing the metadata to at least one of the number of services that are part of a bitmap of the hash table, and receiving data defining the at least one action. Further, distributing the hash table may include distributing the hash table using a gossip protocol.

At 306, the of FIG. 32, the method 300 may further include receiving from the at least one service endpoint, an indication as to how traffic associated with the data packet is to be handled. The indication as to how traffic associated with the data packet may include, for example, four actions may including ignore, service chain, drop, and copy.

At 308, the method 300 may include determining which of the ignore action, the service chain action, the drop action, and the copy action is returned as the feedback. In one example, in response to a determination that the feedback includes the drop action, the method 300 may include dropping the data packet, and propagating instructions to at least one of the second network device or a third network device to drop additional data packets of a same type as the data packet as part of the enabling the traffic at 310 based at least in part on feedback received from the at least one service endpoint.

In response to a determination that the feedback includes the ignore action at 308, the enabling the traffic at 310 based at least in part on feedback received from the at least one service endpoint may include ignoring the data packet, dropping the data packet when the data packet is closed, and propagating instructions to at least one of the second network device or the third network device to drop additional data packets of the same type as the data packet. In response to a determination that the feedback includes the service chain action at 308, the enabling of the traffic at 310 based at least in part on feedback received from the at least one service endpoint may include service chaining a first service of the number of services to a second service of the number of services, forwarding the data packet from the first network device to the second network device, and at the second network device, comparing the first service flow hash entry of the first network device as defined in the hash table with a second service flow hash entry of the second network device as defined in the hash table.

At 308 and in response to a determination that a bit of the second service flow hash entry is not set in the first service flow hash entry, restricting the forwarding of the data packet to the first service when enabling of the traffic at 310 based at least in part on feedback received from the at least one service endpoint. In response to a determination that the bit of the second service flow hash entry is set in the first service flow hash entry, the forwarding of the data packet to the first service may be restricted.

Further, at 308, in response to a determination that the feedback includes the copy action, enabling of the traffic at 310 based at least in part on feedback received from the at least one service endpoint may include copying the data packet, forwarding the data packet to the first service, and propagating instructions to at least one of the second network device or the third network device to copy additional data packets of the same type as the data packet.

At 312, the method 300 may further include creating a first service flow hash entry (ServiceFlowHashEntry) of a hash table associated with the data packet at the first network device. The first service flow hash entry identifies each of a number of services using a unique number. At 314 the hash table including the first service flow hash entry may be distributed across the fabric 102 to at least a second network device.

At 316, a second or subsequent service flow hash entry of the hash table associated with the data packet may be created at the second network device to create an updated hash table. Further, at 318, the updated hash table may be distributed across the fabric to at least one of the first network device or a third network device. At least one of the first service flow hash entry, a second service flow hash entry, and/or other service flow hash entries of the hash table may be maintained at runtime at at least one of the first network device and the second network device.

Figure 4:
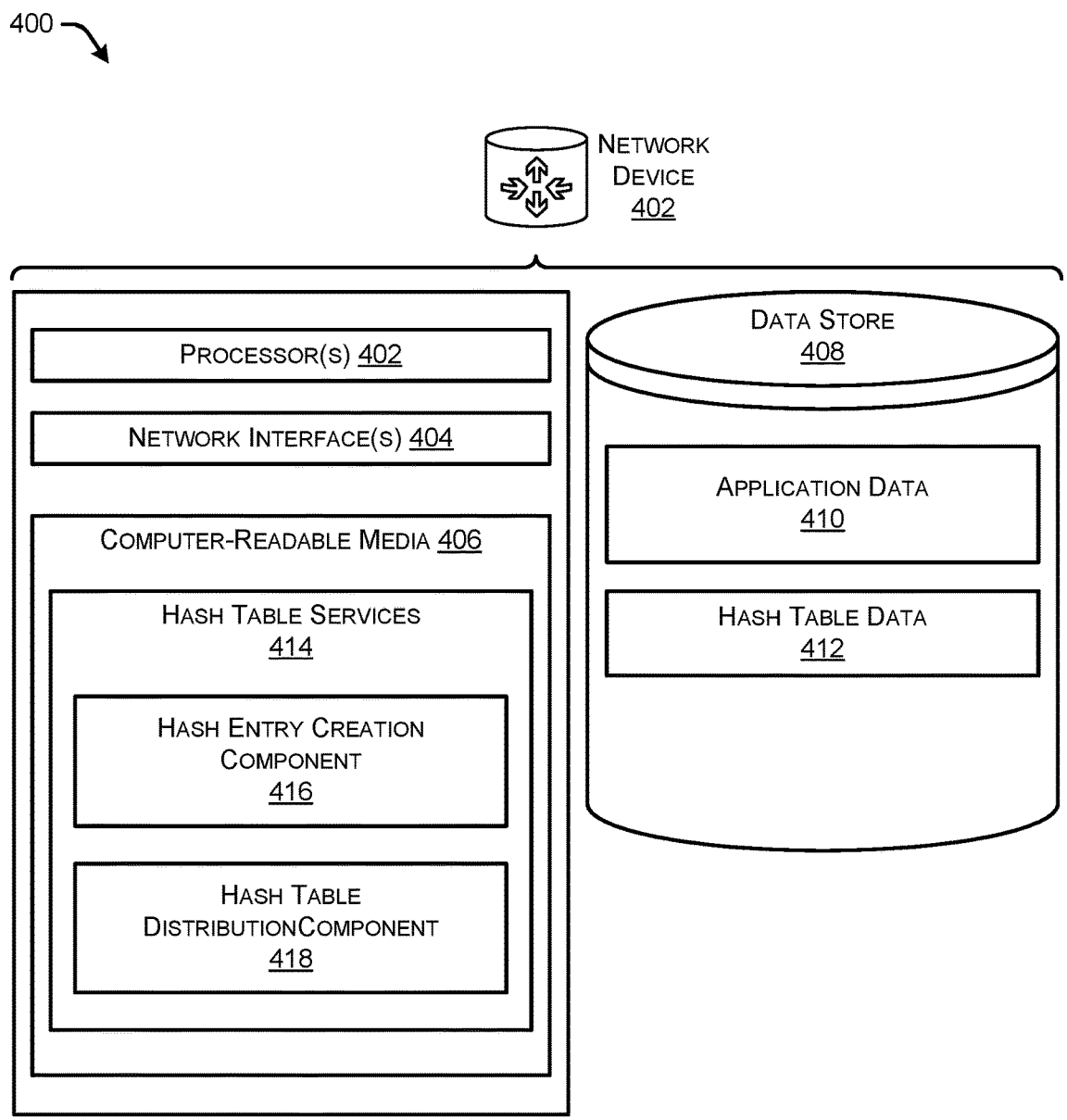
FIG. 4 is a component diagram of example components of a client device including a local agent, according to an example of the principles described herein.

FIG. 4 is a component diagram 400 of example components of a network device 402 device, according to an example of the principles described herein. The network device 402 may include any of the network devices (e.g., the spine nodes 104, the border leaf node(s) 106, and the leaf nodes 108, etc.) in the fabric 102 that utilize the service-oriented cloud networks 110 and their associated devices and services. As illustrated, the network device 402 may include one or more hardware processor(s) 402 configured to execute one or more stored instructions. The processor(s) 402 may include one or more cores. Further, the network device 402 may include one or more network interfaces 404 configured to provide communications between the network device 402 and other devices, such as devices associated with the system architecture of FIG. 1 including the spine nodes 104, the border leaf node(s) 106, and the leaf nodes 108, the service-oriented cloud networks 110, and/or other systems or devices associated with the network device 402 and/or remote from the network device 402. The network interfaces 404 may include devices configured to couple to personal area networks (PANs), wired and wireless local area networks (LANs), wired and wireless wide area networks (WANs), and so forth. For example, the network interfaces 404 may include devices compatible with the spine nodes 104, the border leaf node(s) 106, and the leaf nodes 108, the service-oriented cloud networks 110, and/or other systems or devices associated with the network device 402 and/or remote from the network device 402.

The network device 402 may also include computer-readable media 406 that stores various executable components (e.g., software-based components, firmware-based components, etc.). In one example, the computer-readable media 406 may include, for example, working memory, random access memory (RAM), read only memory (ROM), and other forms of persistent, non-persistent, volatile, non-volatile, and other types of data storage. In addition to various components discussed herein, the computer-readable media 406 may further store components to implement functionality described herein. While not illustrated, the computer-readable media 406 may store one or more operating systems utilized to control the operation of the one or more devices that include the network device 402. According to one example, the operating system includes the LINUX operating system. According to another example, the operating system(s) include the WINDOWS SERVER operating system from MICROSOFT Corporation of Redmond, Washington. According to further examples, the operating system(s) may include the UNIX operating system or one of its variants. It may be appreciated that other operating systems may also be utilized.

Additionally, the network device 402 may include a data store 408 which may include one, or multiple, repositories or other storage locations for persistently storing and managing collections of data such as databases, simple files, binary, and/or any other data. The data store 408 may include one or more storage locations that may be managed by one or more database management systems. The data store 408 may store, for example, application data 410 defining computer-executable code utilized by the processor 402 to execute the systems and methods described herein. Further, the application data 410 may include data relating to user preferences associated with the applications, passwords, usernames, key/value data, and other data that may be used to sign on to the services provided by the service-oriented cloud networks 110.

Further, the data store 408 may store a hash table data 412. The hash table data 412 may include any data obtained by the network device 402 regarding the service flow hash entries (e.g., ServiceFlowHashEntry) created by the network device 402. This hash table data 412 may include, for example, the data defined in Tables 1 and 2 including data defining a number of services types available via the service-oriented cloud networks 110, a bit number identifying the type of service, a traffic flow identification (ID) (e.g., traffic flow A→B), an ID of the network device (e.g., a switch ID), a service hash entry key, a service hash entry value, other data described herein that may assist in the dynamic insertion or removal of policy or security rules for network traffic, and combinations thereof.

The computer-readable media 406 may store portions, or components, of hash table services 414. For instance, the hash table services 414 of the computer-readable media 406 may include a hash entry creation component 416 to, when executed by the processor(s) 402, create a number of service flow hash entries (e.g., ServiceFlowHashEntry) within a hash table. The computer-readable media 406 may also include a hash table distribution component 418 to, when executed by the processor(s) 402, distribute a hash table including the number of service flow hash entries (e.g., ServiceFlowHashEntry) to a number of other network devices (e.g., the spine nodes 104, the border leaf node(s) 106, and the leaf nodes 108, etc.) within the fabric 102. The computer-readable media 406 may also include any number of additional components that may cause the methods and systems described herein to be realized.

Figure 5:
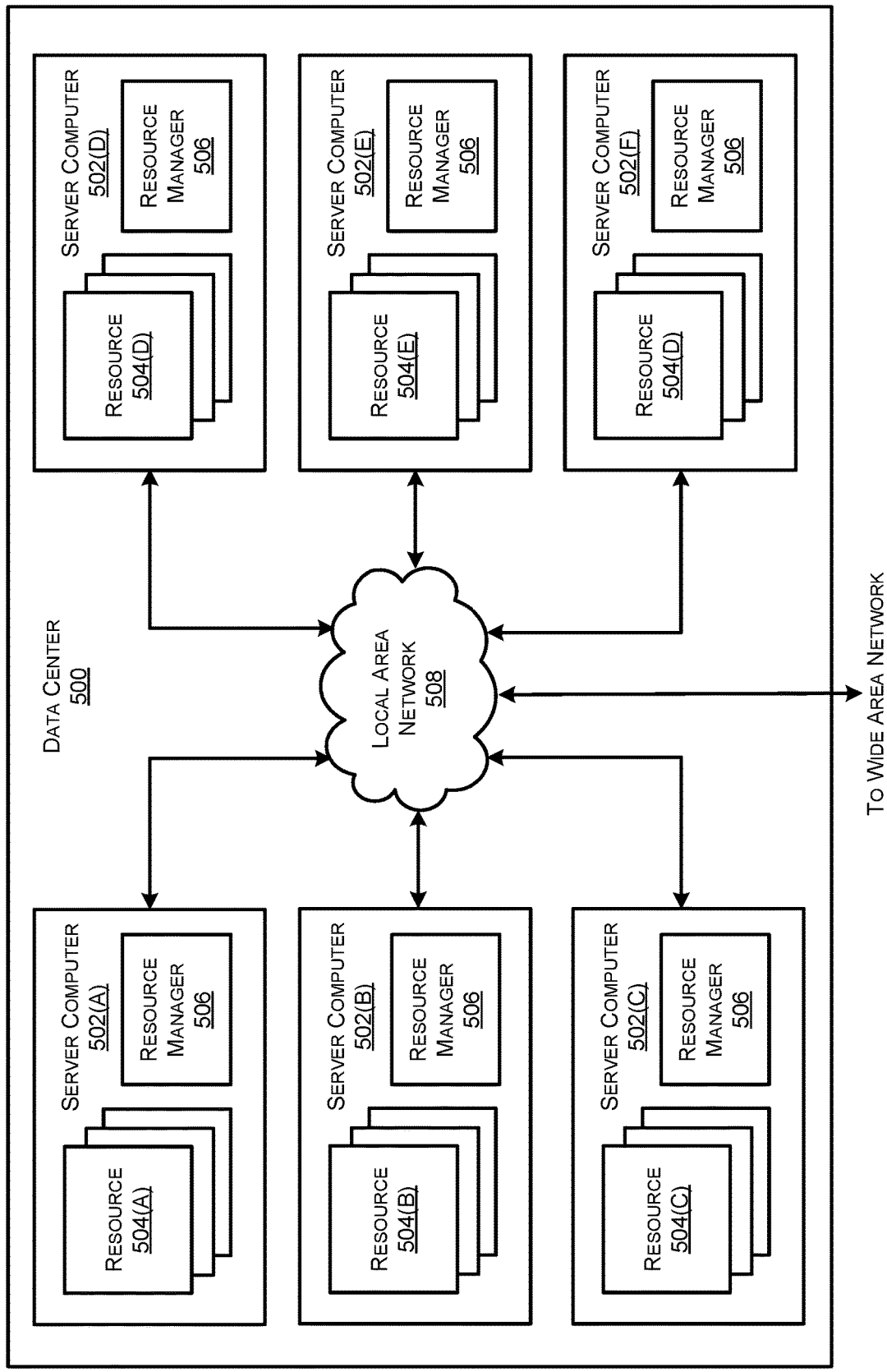
FIG. 5 illustrates a computing system diagram illustrating a configuration for a data center that may be utilized to implement aspects of the technologies disclosed herein.

FIG. 5 illustrates a computing system diagram illustrating a configuration for a data center 500 that may be utilized to implement aspects of the technologies disclosed herein. The example data center 500 shown in FIG. 5 includes several server computers 502A-502F (which might be referred to herein singularly as "a server computer 502" or in the plural as "the server computers 502) for providing computing resources. In some examples, the resources and/or server computers 502 may include, or correspond to, any type of networked device described herein. Although described as servers, the server computers 502 may include any type of networked device, such as servers, switches, routers, hubs, bridges, gateways, modems, repeaters, access points, etc.

The server computers 502 may be standard tower, rackmount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, virtual private networks (VPNs), and others. Some of the server computers 502 may also be configured to execute a resource manager 506 capable of instantiating and/or managing the computing resources. In the case of VM instances, for example, the resource manager 506 may be a hypervisor or another type of program configured to enable the execution of multiple VM instances on a single server computer 502. Server computers 502 in the data center 500 may also be configured to provide network services and other types of services.

In the example data center 500 shown in FIG. 5, an appropriate LAN 508 is also utilized to interconnect the server computers 502A-502F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 500, between each of the server computers 502A-502F in each data center 500, and, potentially, between computing resources in each of the server computers 502. It may be appreciated that the configuration of the data center 500 described with reference to FIG. 5 is merely illustrative and that other implementations may be utilized.

In some examples, the server computers 502 and or the computing resources 504 may each execute/host one or more tenant containers and/or virtual machines to perform techniques described herein.

In some instances, the data center 500 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 504 provided by the cloud computing network may include various types of computing resources, such as data processing resources like tenant containers and VM instances, data storage resources, networking resources, data communication resources, network services, VPN instances, and the like.

Each type of computing resource 504 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 504 not mentioned specifically herein.

The computing resources 504 provided by a cloud computing network may be enabled in one example by one or more data centers 500 (which might be referred to herein singularly as "a data center 500" or in the plural as "the data centers 500). The data centers 500 are facilities utilized to house and operate computer systems and associated components. The data centers 500 typically include redundant and backup power, communications, cooling, and security systems. The data centers 500 may also be located in geographically disparate locations. One illustrative example for a data center 500 that may be utilized to implement the technologies disclosed herein is described herein with regard to, for example, FIGS. 1 through 4.

Figure 6:
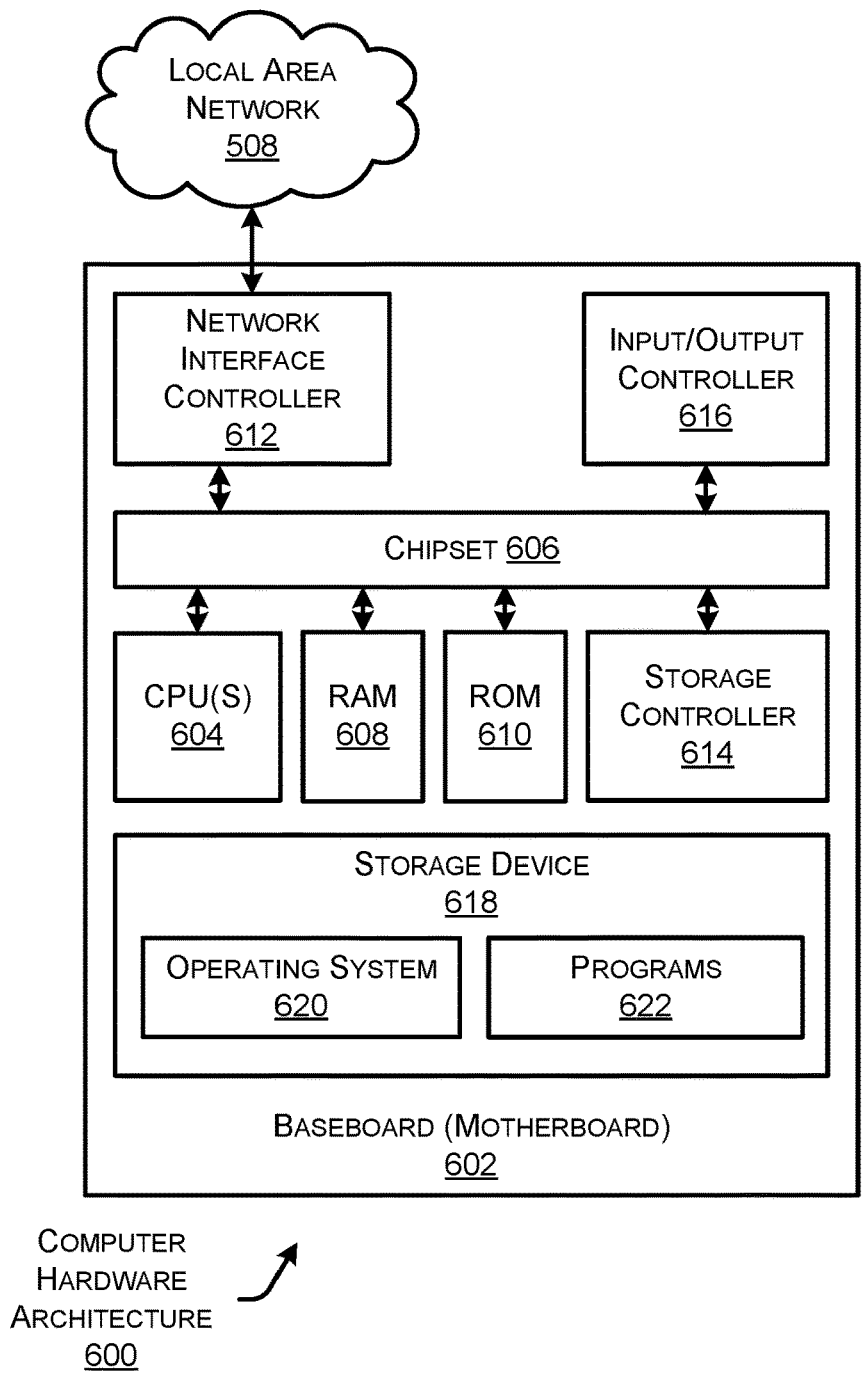
FIG. 6 illustrates a computer architecture diagram showing an example computer hardware architecture for implementing a computing device that may be utilized to implement aspects of the various technologies presented herein.

FIG. 6 illustrates a computer architecture diagram showing an example computer hardware architecture 600 for implementing a computing device that may be utilized to implement aspects of the various technologies presented herein. The computer hardware architecture 600 shown in FIG. 6 illustrates the spine nodes 104, the border leaf node(s) 106, and the leaf nodes 108, the service-oriented cloud networks 110, and/or other systems or devices associated with the network device 402 and/or remote from the network device 402, a workstation, a desktop computer, a laptop, a tablet, a network appliance, an e-reader, a smartphone, or other computing device, and may be utilized to execute any of the software components described herein. The computer 600 may, in some examples, correspond to a network device (e.g., the spine nodes 104, the border leaf node(s) 106, and the leaf nodes 108, the service-oriented cloud networks 110, and/or other systems or devices associated with the network device 402 and/or remote from the network device 402 (and associated devices) described herein, and may include networked devices such as servers, switches, routers, hubs, bridges, gateways, modems, repeaters, access points, etc.

The computer 600 includes a baseboard 602, or "motherboard," which is a printed circuit board to which a multitude of components or devices may be connected by way of a system bus or other electrical communication paths. In one illustrative configuration, one or more central processing units (CPUs) 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computer 600.

The chipset 606 may further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM may also store other software components necessary for the operation of the computer 600 in accordance with the configurations described herein.

The computer 600 may operate in a networked environment using logical connections to remote computing devices and computer systems through a network, such as the spine nodes 104, the border leaf node(s) 106, and the leaf nodes 108, the service-oriented cloud networks 110, and/or other systems or devices associated with the network device 402 and/or remote from the network device 402, among other devices. The chipset 606 may include functionality for providing network connectivity through a Network Interface Controller (NIC) 612, such as a gigabit Ethernet adapter. The NIC 612 is capable of connecting the computer 600 to other computing devices within the network 100 and external to the network 100. It may be appreciated that multiple NICs 612 may be present in the computer 600, connecting the computer to other types of networks and remote computer systems. In some examples, the NIC 612 may be configured to perform at least some of the techniques described herein, such as packet redirects and/or other techniques described herein.

The computer 600 may be connected to a storage device 618 that provides non-volatile storage for the computer. The storage device 618 may store an operating system 620, programs 622 (e.g., any computer-readable and/or computer-executable code described herein), and data, which have been described in greater detail herein. The storage device 618 may be connected to the computer 600 through a storage controller 614 connected to the chipset 606. The storage device 618 may consist of one or more physical storage units. The storage controller 614 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 600 may store data on the storage device 618 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 618 is characterized as primary or secondary storage, and the like.

For example, the computer 600 may store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the storage device 618 by detecting the physical states or characteristics of one or more particular locations within the physical storage units.

In addition to the storage device 618 described above, the computer 600 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 600. In some examples, the operations performed by the spine nodes 104, the border leaf node(s) 106, and the leaf nodes 108, the service-oriented cloud networks 110, and/or other systems or devices associated with the network device 402 and/or remote from the network device 402, and or any components included therein, may be supported by one or more devices similar to computer 600. Stated otherwise, some or all of the operations performed by the spine nodes 104, the border leaf node(s) 106, and the leaf nodes 108, the service-oriented cloud networks 110, and/or other systems or devices associated with the network device 402 and/or remote from the network device 402, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 618 may store an operating system 620 utilized to control the operation of the computer 600. According to one example, the operating system 620 includes the LINUX operating system. According to another example, the operating system includes the WINDOWS® SERVER operating system from MICROSOFT Corporation of Redmond, Washington. According to further examples, the operating system may include the UNIX operating system or one of its variants. It may be appreciated that other operating systems may also be utilized. The storage device 618 may store other system or application programs and data utilized by the computer 600.

In one example, the storage device 618 or other computer-readable storage media is encoded with computer-executable instructions which, when loaded into the computer 600, transform the computer from a general-purpose computing system into a special-purpose computer capable of implementing the examples described herein. These computer-executable instructions transform the computer 600 by specifying how the CPUs 604 transition between states, as described above. According to one example, the computer 600 has access to computer-readable storage media storing computer-executable instructions which, when executed by the computer 600, perform the various processes described above with regard to FIGS. 1 through 5. The computer 600 may also include computer-readable storage media having instructions stored thereupon for performing any of the other computer-implemented operations described herein.

The computer 600 may also include one or more input/output controllers 616 for receiving and processing input from a number of input devices, such as a keyboard, a mouse, a touchpad, a touch screen, an electronic stylus, or other type of input device. Similarly, an input/output controller 616 may provide output to a display, such as a computer monitor, a flat-panel display, a digital projector, a printer, or other type of output device. It will be appreciated that the computer 600 might not include all of the components shown in FIG. 6, may include other components that are not explicitly shown in FIG. 6, or might utilize an architecture completely different than that shown in FIG. 6.

As described herein, the computer 600 may include one or more of the spine nodes 104, the border leaf node(s) 106, and the leaf nodes 108, the service-oriented cloud networks 110, and/or other systems or devices associated with the network device 402 and/or remote from the network device 402. The computer 600 may include one or more hardware processor(s) such as the CPUs 604 configured to execute one or more stored instructions. The CPUs 604 may include one or more cores. Further, the computer 600 may include one or more network interfaces configured to provide communications between the computer 600 and other devices, such as the communications described herein as being performed by the spine nodes 104, the border leaf node(s) 106, and the leaf nodes 108, the service-oriented cloud networks 110, and/or other systems or devices associated with the network device 402 and/or remote from the network device 402, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may include any type of programs or processes to perform the techniques described in this disclosure for the spine nodes 104, the border leaf node(s) 106, and the leaf nodes 108, the service-oriented cloud networks 110, and/or other systems or devices associated with the network device 402 and/or remote from the network device 402 as described herein. The programs 622 may enable the devices described herein to perform various operations.

CONCLUSION

The examples described herein provide systems, methods, and computer-readable medium that create a number of service flow hash entries (e.g., ServiceFlowHashEntry) of a hash table that may be used as a normalized way of representing a traffic flow allowing for the service-oriented cloud networks 110 to push changes to the rules or policies set by the service-oriented cloud networks 110 to the fabric 102 and the network devices (e.g., the spine nodes 104, the border leaf node 106, and the leaf nodes 108, etc.) rather than a reactive and less effective controller within the fabric 102.

Further, the present systems, methods, and computer-readable medium allow for the selection of service chaining on each individual leaf node so that service chaining may be enforced at which ever of the network devices (e.g., the spine nodes 104, the border leaf node 106, and the leaf nodes 108, etc.) the services are available and to allow intermediate network devices to appropriately forward the traffic flow. Still further, the present systems, methods, and computer-readable medium provide for the ability to optimize the service flow hash entry (e.g., ServiceFlowHashEntry) of the hash table in the network devices (e.g., the spine nodes 104, the border leaf node 106, and the leaf nodes 108, etc.) by dropping the traffic flow at the ingress of the fabric 102 (e.g., at the border leaf node 106). This may assist in saving entries in the network devices while also saving on bandwidth of the service devices.

Even still further, the present systems, methods, and computer-readable medium provide for the sharing of system location specific metadata to enable the services of the service-oriented cloud networks 110 to enforce location specific security profiles and data inspection. In this manner, the traffic flows may be inspected based on where the traffic flow is coming from. The present systems, methods, and computer-readable medium are service-endpoint aware such that the destination (e.g., an endpoint among the network devices (e.g., the spine nodes 104, the border leaf node 106, and the leaf nodes 108, etc.)) of the data packets of traffic flow are known. Further, the present systems, methods, and computer-readable medium are service-agnostic such that any number of a type of service such as different types of firewalls are all identified as being of the same type of service (e.g., a firewall in general).

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of managing security rules performed by a first network device of a fabric, comprising:
    extracting, by the first network device, metadata from a data packet received at the first network device, the metadata comprising network metadata and network system metadata;
    distributing, by the first network device, the metadata to at least one service endpoint registered with the first network device;
    receiving, by the first network device and from the at least one service endpoint, an indication as to how traffic associated with the data packet is to be handled;
    enabling, by the first network device, the traffic based at least in part on feedback received from the at least one service endpoint;
    generating, by the first network device and based in part on enabling the traffic, a first service flow hash entry (ServiceFlow HashEntry) in a hash table associated with the data packet and stored in memory of the first network device, the first service flow hash entry identifying each of a number of services using a unique number; and
    in response to generating the first service flow hash entry, distributing, by the first network device, the hash table comprising the first service flow hash entry across the fabric to at least a second network device.

2. The method of claim 1, further comprising:
    creating a second service flow hash entry of the hash table associated with the data packet at the second network device to create an updated hash table; and distributing the updated hash table across the fabric to at least one of the first network device or a third network device.

3. The method of claim 1, wherein the at least one service endpoint is registered with the at least one of the first network device and the second network device.

4. The method of claim 1, wherein the feedback from the service endpoint comprises at least one action comprising an ignore action, a service chain action, a drop action, or a copy action.

5. The method of claim 4, wherein distributing the metadata to the at least one service endpoint registered with the first network device comprises:
distributing the metadata to at least one of the number of services that are part of a bitmap of the hash table; and
receiving data defining the at least one action.

6. The method of claim 4, further comprising:
determining which of the ignore action, the service chain action, the drop action, and the copy action is returned as the feedback;
in response to a determination that the feedback comprises the drop action:
dropping the data packet; and
propagating instructions to at least one of the second network device or a third network device to drop additional data packets of a same type as the data packet;
in response to a determination that the feedback comprises the ignore action:
ignoring the data packet;
dropping the data packet when the data packet is closed; and
propagating instructions to at least one of the second network device or the third network device to drop additional data packets of the same type as the data packet;
in response to a determination that the feedback comprises the service chain action:
service chaining a first service of the number of services to a second service of the number of services;
forwarding the data packet from the first network device to the second network device; and
at the second network device, comparing the first service flow hash entry of the first network device as defined in the hash table with a second service flow hash entry of the second network device as defined in the hash table;
in response to a determination that a bit of the second service flow hash entry is not set in the first service flow hash entry, restricting the forwarding of the data packet to the first service; and
in response to a determination that the bit of the second service flow hash entry is set in the first service flow hash entry, restricting the forwarding of the data packet to the first service; and
in response to a determination that the feedback comprises the copy action:
copying the data packet;
forwarding the data packet to the first service; and
propagating instructions to at least one of the second network device or the third network device to copy additional data packets of the same type as the data packet.

7. The method of claim 1, wherein distributing the hash table comprises distributing the hash table using a gossip protocol.

8. The method of claim 1, wherein at least one of the first service flow hash entry and a second service flow hash entry of the hash table is maintained at runtime at at least one of the first network device and the second network device.

9. A system comprising:
a processor of a first network device of a fabric; and
a non-transitory computer-readable media storing instructions that, when executed by the processor, causes the processor to perform operations comprising:
extracting, by the first network device, metadata from a data packet received at the first network device, the metadata comprising network metadata and network system metadata;
distributing, by the first network device, the metadata to at least one service endpoint registered with the first network device;
receiving, by the first network device and from the at least one service endpoint, an indication as to how traffic associated with the data packet is to be handled;
enabling, by the first network device, the traffic based at least in part on feedback received from the at least one service endpoint;
generating, by the first network device and based in part on enabling the traffic, a first service flow hash entry (ServiceFlowHashEntry) in a hash table associated with the data packet and stored in memory of the first network device, the first service flow hash entry identifying each of a number of services using a unique number; and
in response to generating the first service flow hash entry, distributing, by the first network device, the hash table comprising the first service flow hash entry across the fabric to at least a second network device.

10. The system of claim 9, the operations further comprising:
creating a second service flow hash entry of the hash table associated with the data packet at the second network device to create an updated hash table; and
distributing the updated hash table across the fabric to at least one of the first network device or a third network device.

11. The system of claim 9, wherein the feedback from the service endpoint comprises at least one action comprising an ignore action, a service chain action, a drop action, or a copy action.

12. The system of claim 9, wherein distributing the hash table comprises distributing the hash table using a gossip protocol.

13. The system of claim 9, wherein at least one of the first service flow hash entry and a second service flow hash entry of the hash table is maintained at runtime at at least one of the first network device and the second network device.

14. The system of claim 9, wherein the first network device is a border leaf network device and the second network device is a non-border leaf network device.

15. The system of claim 9, wherein at least one of the number of services is provided by a cloud network coupled to the fabric.

16. A non-transitory computer-readable medium storing instructions that, when executed, causes a processor of a first network device of a fabric to perform operations, comprising:

extracting, by the first network device, metadata from a data packet received at the first network device, the metadata comprising network metadata and network system metadata;

distributing, by the first network device, the metadata to at least one service endpoint registered with the first network device;

receiving, by the first network device and from the at least one service endpoint, an indication as to how traffic associated with the data packet is to be handled;

enabling, by the first network device, the traffic based at least in part on feedback received from the at least one service endpoint;

generating, by the first network device and based in part on enabling the traffic, a first service flow hash entry (ServiceFlowHashEntry) in a hash table associated with the data packet and stored in memory of the first network device, the first service flow hash entry identifying each of a number of services using a unique number; and in response to generating the first service flow hash entry, distributing, by the first network device, the hash table comprising the first service flow hash entry across the fabric to at least a second network device.

17. The non-transitory computer-readable medium of claim 16, the operations further comprising:

creating a second service flow hash entry of the hash table associated with the data packet at the second network device to create an updated hash table; and distributing the updated hash table across the fabric to at least one of the first network device or a third network device.

18. The non-transitory computer-readable medium of claim 17, wherein at least one of the first service flow hash entry and the second service flow hash entry of the hash table is maintained at runtime at at least one of the first network device and the second network device.

19. The non-transitory computer-readable medium of claim 16, wherein the feedback from the service endpoint comprises at least one action comprising an ignore action, a service chain action, a drop action, or a copy action.

20. The non-transitory computer-readable medium of claim 16, wherein distributing the hash table comprises distributing the hash table using a gossip protocol.

* * * * *